United States Patent
Chen et al.

(10) Patent No.: US 9,734,555 B2
(45) Date of Patent: *Aug. 15, 2017

(54) GENERATING A TREE MAP

(71) Applicant: International Business Machines Corporation, Armonk, NY (US)

(72) Inventors: Hao Chen, Beijing (CN); Ya Bin Dang, Beijing (CN); Howard M. Hess, Chicago, IL (US); Feng Li, Beijing (CN); Shao Chun Li, Beijing (CN); Xin Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/745,947

(22) Filed: Jun. 22, 2015

(65) Prior Publication Data

US 2015/0287226 A1 Oct. 8, 2015

Related U.S. Application Data

(63) Continuation of application No. 14/625,830, filed on Feb. 19, 2015, now Pat. No. 9,472,003.

(30) Foreign Application Priority Data

Feb. 28, 2014 (CN) .......................... 2014 1 0073362

(51) Int. Cl.
*G06T 11/20* (2006.01)
*G06T 3/40* (2006.01)

(52) U.S. Cl.
CPC .............. *G06T 3/40* (2013.01); *G06T 11/206* (2013.01); *G06T 2200/16* (2013.01)

(58) Field of Classification Search
None
See application file for complete search history.

(56) References Cited

U.S. PATENT DOCUMENTS

| 7,027,052 B1* | 4/2006 | Thorn | G06T 11/206 345/440 |
| 2013/0127870 A1* | 5/2013 | Baudel | G06F 9/4443 345/441 |

OTHER PUBLICATIONS

Hao Chen, et a.,"Generating a Tree Map," U.S. Appl. No. 14/625,830, filed Feb. 19, 2015.

(Continued)

*Primary Examiner* — Frank Chen
(74) *Attorney, Agent, or Firm* — Cantor Colburn LLP; Keivan Razavi

(57) ABSTRACT

A method for generating a tree map for tree map visualization includes obtaining node information of a plurality of nodes to be processed, the plurality of nodes to be processed being sub-nodes sharing a same parent node and the node information comprising at least sizes of the nodes; determining from the plurality of nodes a plurality of candidate nodes whose sizes are less than a threshold size; determining at least one super node including the plurality of candidate nodes based on the node information of the determined plurality of candidate nodes, a screen size, and the threshold size, such that when displaying in a zooming-in mode the super node on the screen, all candidate nodes in the super node are displayed at display sizes not less than the threshold size; and determining data required for displaying the tree map based on the determined super node.

5 Claims, 9 Drawing Sheets

(56) References Cited

OTHER PUBLICATIONS

List of IBM Patent Applications Treated as Related: CN920140016US2, Date Filed: Jun. 22, 2015, p. 1-2.
Hao Chen, et al., "Generating a Tree Map," U.S. Appl. No. 15/255,607, filed Sep. 2, 2016.
List of IBM Patents or Patent Applications Treated as Related; (Appendix P), Filed Sep. 7, 2016, 2 pages.

* cited by examiner

GENERATING A TREE MAP

This application is a continuation of U.S. patent application Ser. No. 14/625,830, filed Feb. 19, 2015, which claims priority to Chinese Patent Application No. 201410073362.3, filed Feb. 28, 2014, and all the benefits accruing therefrom under 35 U.S.C. §119, the contents of which in its entirety are herein incorporated by reference.

BACKGROUND

The present invention is related to information visualization, and more particularly to a method and an apparatus for generating a tree map.

A tree map is a tool for data visualization by displaying a hierarchical view of tree-structured data, in the form of nested rectangles. In the prior art, several mature algorithms are available for displaying a tree map, where details may be found at: http://en.wikipedia.org/wiki/Treemapping. Tree maps may be applied to various fields, for example, applicable for making disk space statistics, displaying project progress, and making population statistics etc. It is possible to display in the whole screen a great amount of node information by means of a tree map. Therefore, the overall concept can be well presented, and it is easier to learn how the entirety is divided into parts, for example, it is easy to observe where the space of a disk goes to and where the budget of a company goes to, and so on.

Next, a description is made with a tree map having nested rectangles (other shapes may be adopted, e.g., fan-shape). In a tree map, one area is normally divided into rectangles representing branches of the tree (each branch of the tree is represented by one rectangle). Each rectangle is filled with small rectangles representing its leaf nodes. The rectangle of each leaf node has two different attributes. Normally, the area of the rectangle is proportional to the size of the leaf node, and the color of the rectangle indicates other dimensional information of the leaf node.

FIG. 3C illustrates a tree map display effect drawing of the prior art, from which the overall concept can be obtained, however it is needed to know detailed information of each node, and therefore although sizes of some nodes are very small (e.g., the lower right corner of FIG. 3C), their information cannot be ignored. In the prior art, the most common approach is to observe the small node by zooming-in the block, however if it is desired to observe all the small nodes, many such actions have to be made, which has low efficiency. Especially, such problem of interaction with low efficiency is serious in the prior art when a great amount of small nodes are in a same layer.

SUMMARY

According to a first aspect of the present invention, there is provided a method for generating a tree map, the method comprising: obtaining node information of a plurality of nodes to be processed, the plurality of nodes to be processed being sub-nodes sharing a same parent node and the node information comprising at least sizes of the nodes; determining from the plurality of nodes a plurality of candidate nodes whose sizes are less than a threshold size; determining at least one super node including the plurality of candidate nodes based on the node information of the determined plurality of candidate nodes, a screen size, and the threshold size, such that when displaying in a zooming-in mode the super node on the screen, all candidate nodes in the super are displayed at display sizes not less than the threshold size; and determining data required for displaying the tree map based on the determined super node.

According to a second aspect of the present invention, there is provided a schematic view of an apparatus for generating a tree map, the apparatus comprising: a node information obtaining module, configured to obtain node information of a plurality of nodes to be processed, the plurality of nodes to be processed being all sub-nodes sharing a same parent node and the node information comprising at least sizes of the nodes; a candidate node determining module, configured to determine from the plurality of nodes a plurality of candidate nodes whose sizes are less than a threshold size; a super node determining module, configured to determine at least one super node including the plurality of candidate nodes based on the node information of the determined plurality of candidate nodes, a screen size, and the threshold size, such that when displaying in a zooming-in mode the super node on the screen, all candidate nodes in the super node can are displayed at display sizes not less than the threshold size; and a display module, configured to determine data required for displaying the tree map based on the determined super node.

With the tree map presented by using the method and the apparatus of the present invention, a user is enabled to see the nodes with very small size in the tree map more conveniently.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
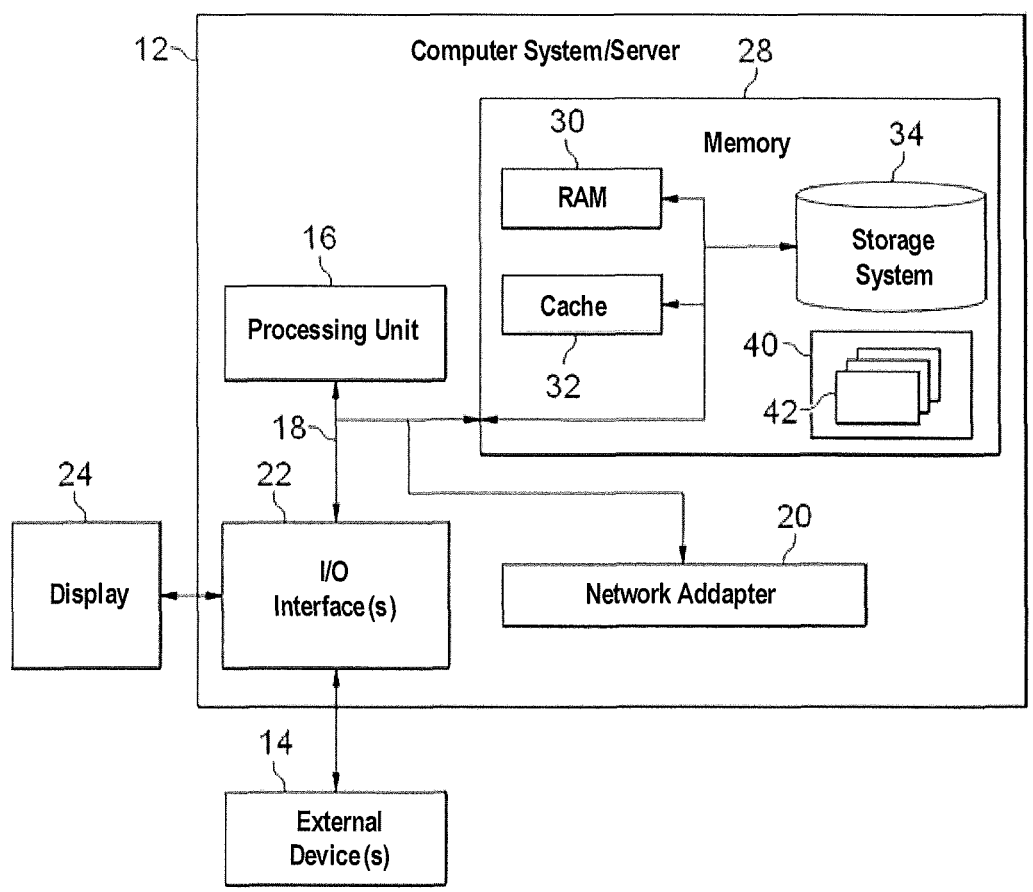
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
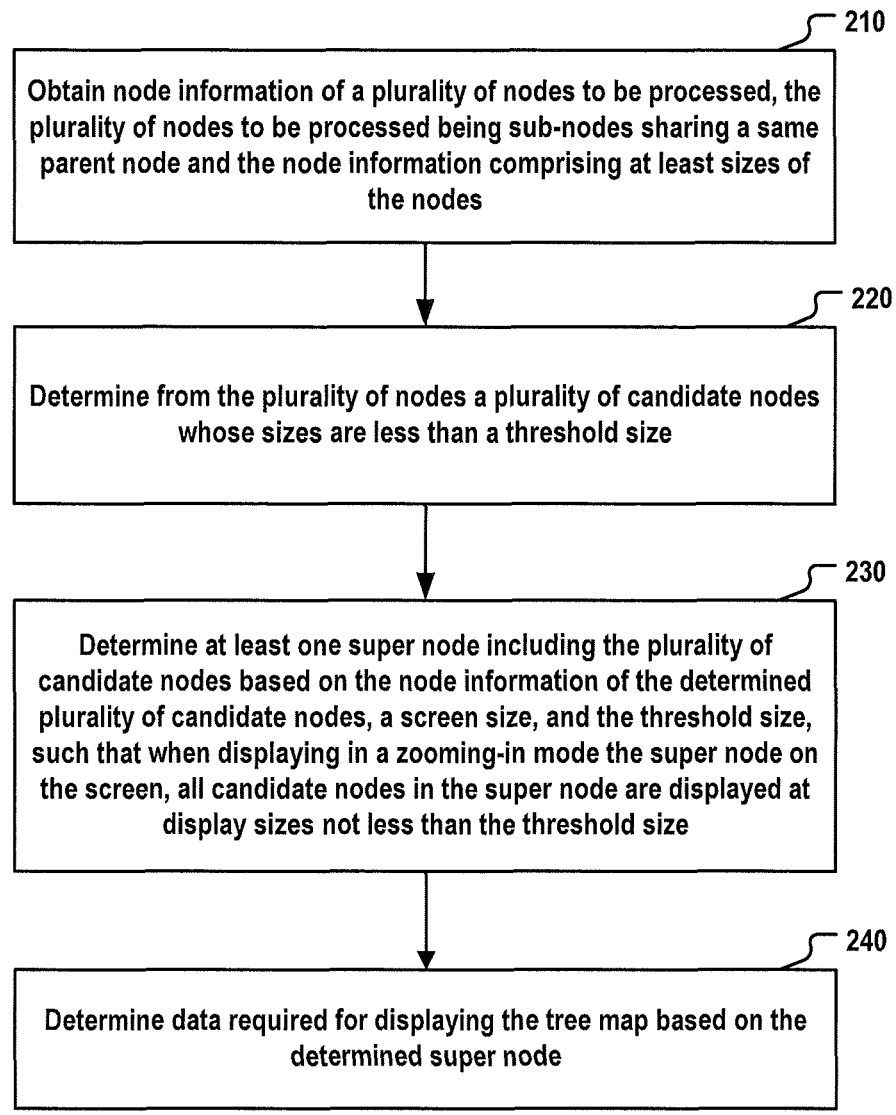
FIG. 2 shows a flow chart of the method for generating a tree map according to one embodiment of the present invention.

With reference now to FIG. 2 which shows a flow chart of the method for generating a tree map according to one embodiment of the present invention. As shown in FIG. 2, the method comprises at least the following operations:

In block 210, node information of a plurality of nodes to be processed is obtained, wherein the plurality of nodes to be processed are sub-nodes sharing a same parent node and the node information comprises at least sizes of the nodes.

In order to support the user checking the very small nodes in a tree map in a zooming-in mode more conveniently, it is necessary to change the relative positions of the nodes in the map. In the tree map, the sub-nodes of a same parent node are displayed in a same display area normally. For example, in the whole display screen, only for the sub-nodes from the same parent node, the position of the node can be changed when re-arranging the display of the nodes, rather than changing the logical relationship of data the tree map represents. As for a great amount of data having no hierarchical structure, they can be deemed as sub-nodes from a same parent node.

When obtaining the node information, besides the size information of the node, based on the specific circumstance, it is also possible to obtain other information, for example, the title of the node.

In block 220, a plurality of candidate nodes whose sizes are less than a threshold size are determined from the plurality of nodes.

Figure 3A:
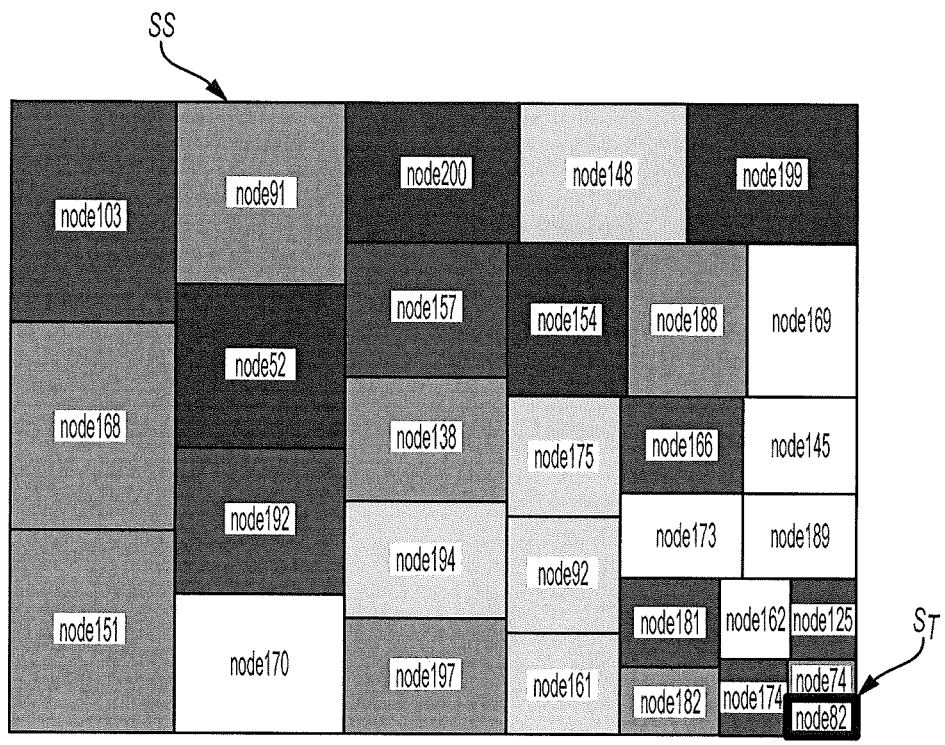
FIG. 3A is a schematic view illustrating relationship between screen size SS and display threshold size $S_T$.

FIG. 3A is used for schematically showing relationship between a screen size SS and a threshold size $S_T$. As shown in FIG. 3A, the screen of the size SS is filled with rectangles representing node information. The threshold size $S_T$ is the minimum recommended value for the node display size for observing the node information conveniently. The particular value of the threshold size $S_T$ can be set by the user according its own experience, and there is no absolute standard, as long as it is assured that the user can easily distinguish the information in each rectangle visually.

In one embodiment, determining the candidate nodes comprises: determining a size ratio Rk of each node which is a proportion of the node to a total size of the plurality of nodes to be processed; determining a screen display size SSk of the node K according to a product of the screen size SS and Rk; determining as the candidate nodes the nodes whose screen display sizes SSk are less than the threshold size. In one embodiment, it further comprises marking the determined candidate nodes.

In block 230, at least one super nodes including the plurality of candidate nodes are determined based on the node information of the determined plurality of candidate nodes, screen size, and the threshold size, such that when displaying in a zooming-in mode the super node on the screen, all the candidate nodes in the super node are displayed at display sizes not less than the threshold size.

In one embodiment, determining the super node comprises: ranking the candidate nodes according to the node sizes; determining accumulation distribution of the node sizes of the candidate nodes; determining an original node in the super node; determining an ending node in the super node according to the accumulation distribution, the threshold size, the screen size and the size of the original node; and determining the super node according to the original node and the ending node.

Figure 3B:
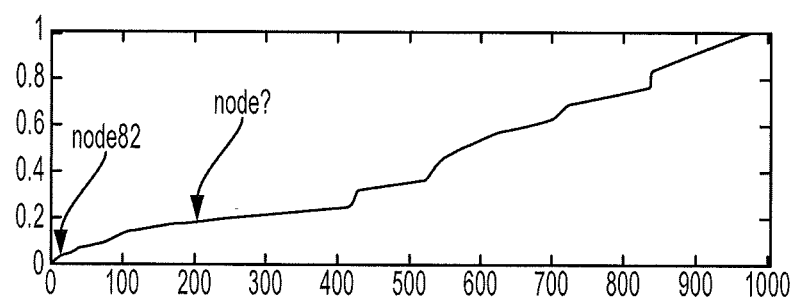
FIG. 3B is a schematic view of accumulation distribution of the candidate nodes according to one embodiment of the present invention.

In the above, the accumulation distribution represents the relationship between the accumulation size of the ranked candidate nodes and the sequential number. Next, the accumulation distribution will be further exemplarily explained with reference to FIG. 3B. In FIG. 3B, the horizontal axis represents the node sequential number after the ranking with a total number of 1000 nodes in this embodiment; and the vertical axis represents status of the accumulation distribution. If a total size of the 1000 nodes is represented by "1," then the accumulation distribution value do corresponding to the $n^{th}$ node represents the accumulation value of the sizes of all the nodes from the $1^{st}$ node to the $n^{th}$ node.

In one embodiment, the ending node is determined based on the Equation $d_i \leq d_s \cdot SS/S_T$, wherein di represents size distribution of the ending node i; ds represents size distribution of the original node s; SS represents the screen size; and $S_T$ represents the threshold size. In the embodiment of FIG. 3B, the node 82 with the smallest size after the ranking may be regarded as the original node, thus it is needed to determine a proper ending node i.

The Equation $d_i \leq d_s \cdot SS/S_T$ is essentially equivalent to determining di through $$\frac{ds}{di=?} \geq \frac{S_T}{SS}.$$

With both of such two approaches, all the nodes from ds to di are determined as one super node, and when displaying in the zooming-in mode the super node on the screen, it is possible to assure that the size of each node will be larger than the set display threshold size $S_T$. One skilled in the art may understand that when "=" is met in the Equation, the number of the nodes contained in each super node are maximized and the effect is optimum; while the effect of do determined based on ">" is the second best, which can however improve interaction efficiency compared to the prior art.

As an improvement, it is possible to nest at least one sub super node in one super node. Applicant will describe this embodiment and how to implement a nested super node in details with reference to FIG. 4.

In another embodiment, determining the super node comprises: ranking the candidate nodes according to the node sizes; dividing the ranked candidate nodes to a plurality candidate node subsets; judging whether all the nodes of each candidate node subset can be identified by zooming-in one time, and dividing the unqualified candidate node subsets until all the nodes of all node sets can be identified by zooming-in on the screen one time; determining the super node according to the divided candidate node subsets.

Next, in block 240 shown in FIG. 2, the data required for displaying the tree map is determined based on the determined super node. In this operation, it is not necessary to actually display the final tree map, but provide the data for displaying the tree map based on which the terminal screen will display the tree map finally.

In this operation, the data for tree map display is determined by the combination of the determined super node and the remaining nodes. When displaying the tree map based on the super node generated by the combination of the existing nodes, only the relative positions of the existing nodes in the map is changed, and the size ratio of the data itself is not adjusted, therefore the existing tree map engine may be used to calculate the area size and color of each node.

Figure 3C:
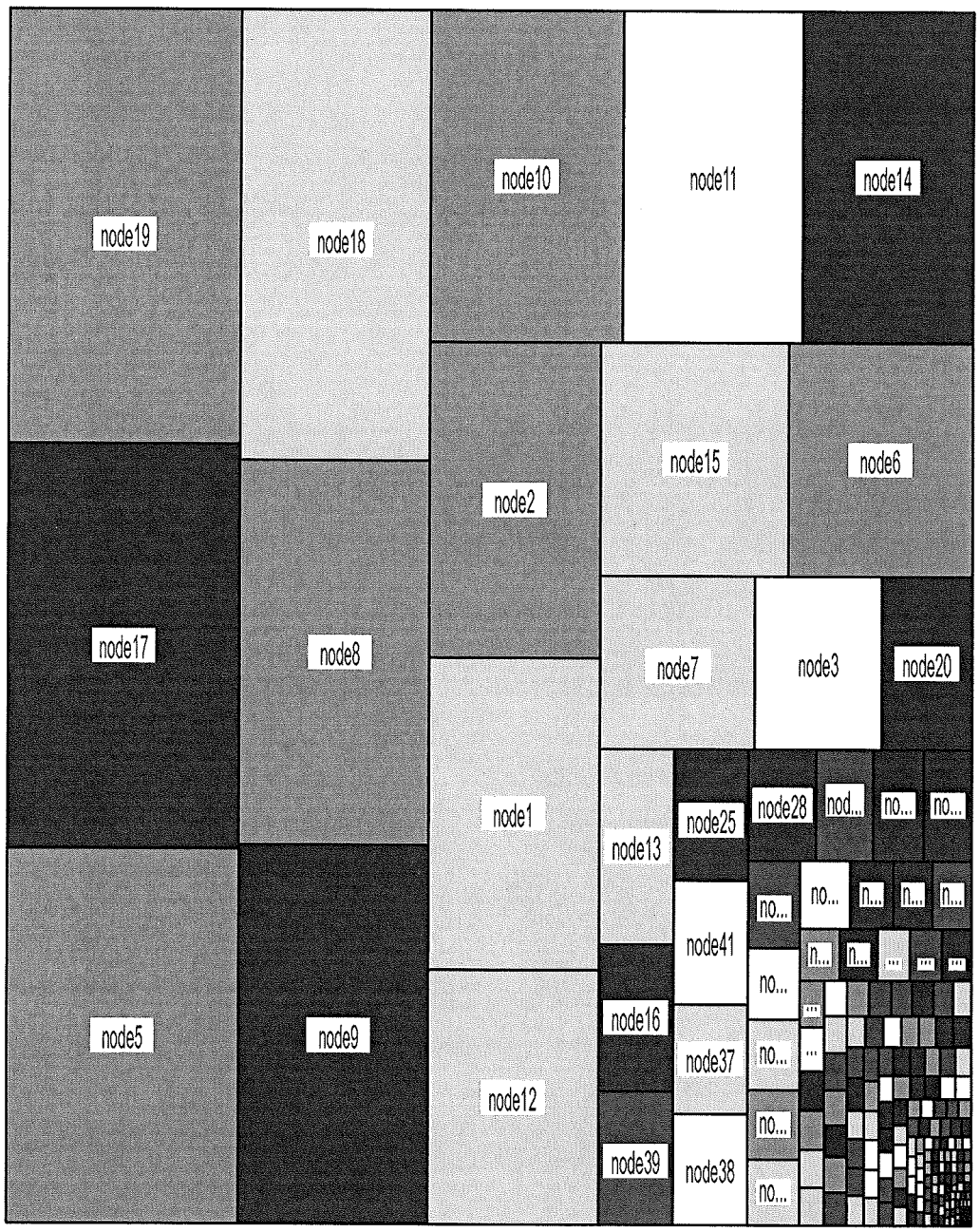
FIG. 3C shows a tree map display in the prior art.
Figure 3D:
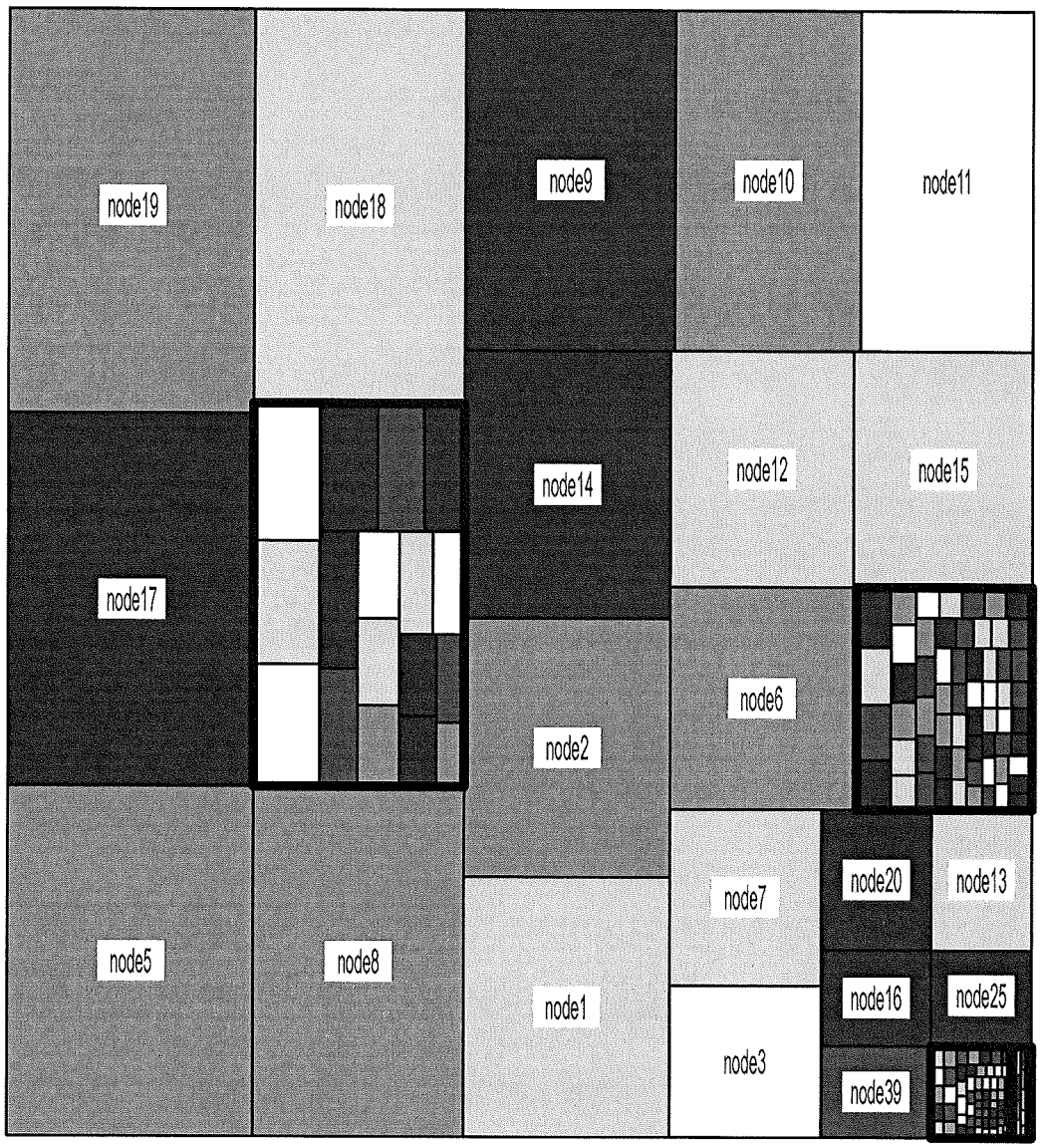
FIG. 3D is a schematic view of the tree map display according to one embodiment of the present invention.

FIG. 3C shows the tree map effect of the prior art, while FIG. 3D shows the tree map effect obtained by the operations of the method of the present invention, wherein each of rectangles surrounded by the bold lines represents one super node.

In an improved embodiment, the method further comprises block 250 in which in response to receipt of an operation for displaying the super node in a zooming-in mode, the data required for displaying the selected super node on the screen in the zooming-in mode is determined.

Figure 3E:
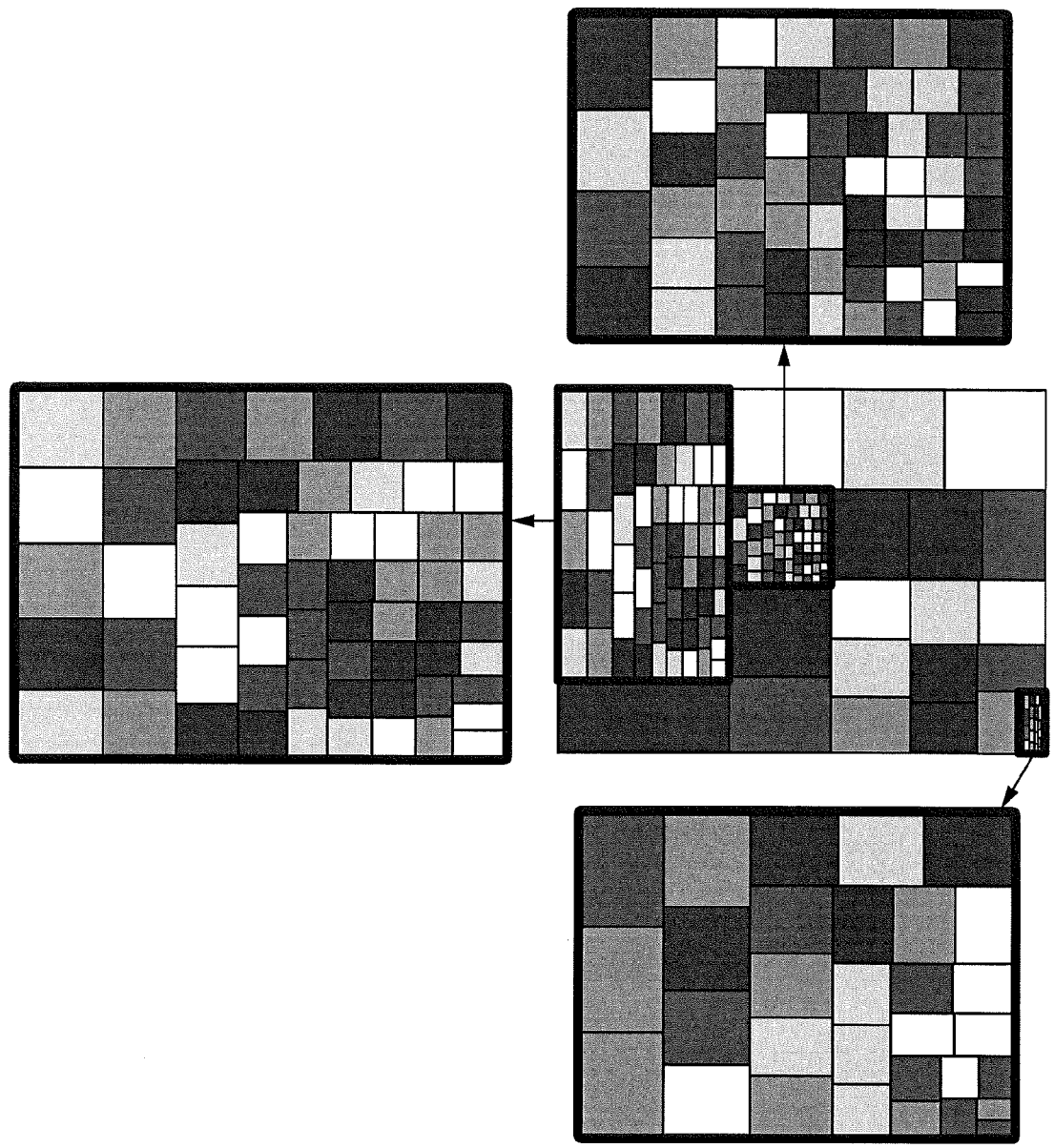
FIG. 3E is an interaction schematic view of the tree map according to one embodiment of the present invention.

FIG. 3E particularly shows a schematic view of the interaction with the tree map generated by the solution of the present application. As shown in FIG. 3E, the tree map includes three super nodes. In response to each super node being selected, it can be displayed in the zooming-in mode on the whole screen and each of the nodes contained in it can be displayed clearly.

Figure 4:
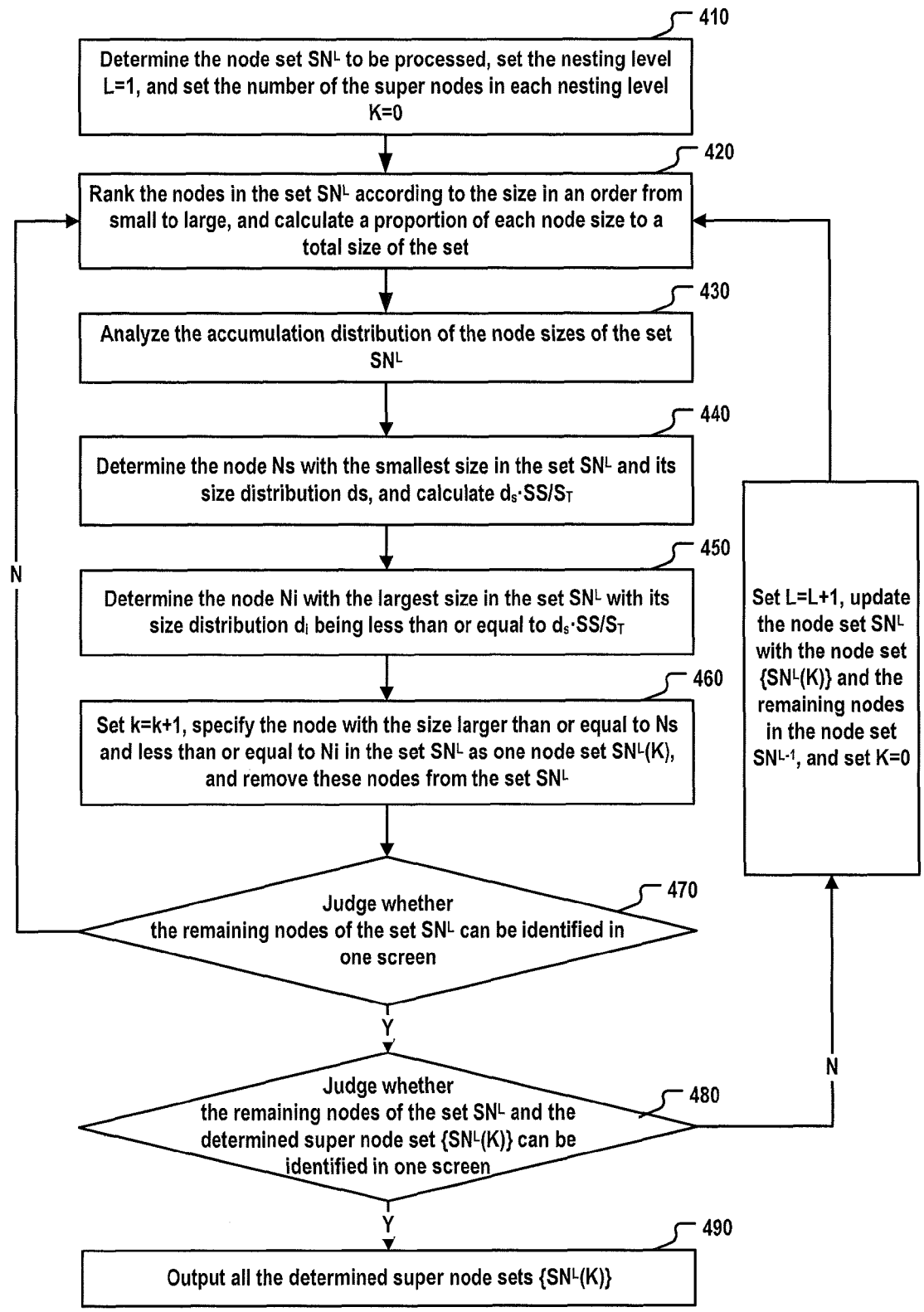
FIG. 4 shows a flow chart of the method for determining a super node according to one embodiment of the present invention.

FIG. 4 shows the operations of determining the super node in an embodiment. With the procedure shown in FIG. 4, at least one super node can be determined based on the determined candidate nodes, the screen size SS, the display threshold $S_T$ and so on. In particular, the procedure shown in FIG. 4 comprises the following operations:

In block 410, the node set $SN^L$ to be processed is determined, and the nesting level is set as L=1, wherein the number k of the super nodes in each nesting level has the original value of 0. In one embodiment, $SN^L$ is the marked candidate nodes, and the nesting level represents one zooming-in level.

In block 420, the nodes in the set $SN^L$ are ranked according to the size in an order from small to large, and a proportion of each node size to a total size of the set is calculated.

In block 430, the accumulation distribution of the node sizes of the set $SN^L$ is analyzed.

In block 440, the node Ns with the smallest size in the set $SN^L$ and its size distribution ds are determined, and then $d_s \cdot SS/S_T$ is calculated. In this operation, the node with the smallest size is regarded as the original node.

In block 450, the node Ni with the largest size in the set $SN^L$ is determined with its size distribution $d_i$ being less than or equal to $d_s \cdot SS/S_T$. In this embodiment, the ending node is determined through determining the node with the largest size in the super node.

In block 460, setting k=k+1, the node with the size larger than or equal to Ns and less than or equal to Ni in the set $SN^L$ is determined as one super node $SN_k^L$, and the nodes of the super node are removed from the set $SN^L$.

In block 470, it is judged whether the remaining nodes of the set $SN^L$ can be identified in one screen, wherein if yes, then it goes to Block 480, and if not, it goes to Block 420.

In block 480, it is judged whether the remaining nodes of the set $SN^L$ and the determined super node set $\{SN_k^L\}$ can be identified in one screen, wherein if yes, then the process goes to Block 490, and if not, L=L+1 is set, and the node set $SN^L$ is updated with the just determined node set $\{SN_k^{L-1}\}$ and the remaining nodes of the node set $SN^{L-1}$; and k=0 is set; then, it goes to Block 420.

In block 490, all the determined super node sets $\{SN_k^L\}$ are output.

Figure 5:
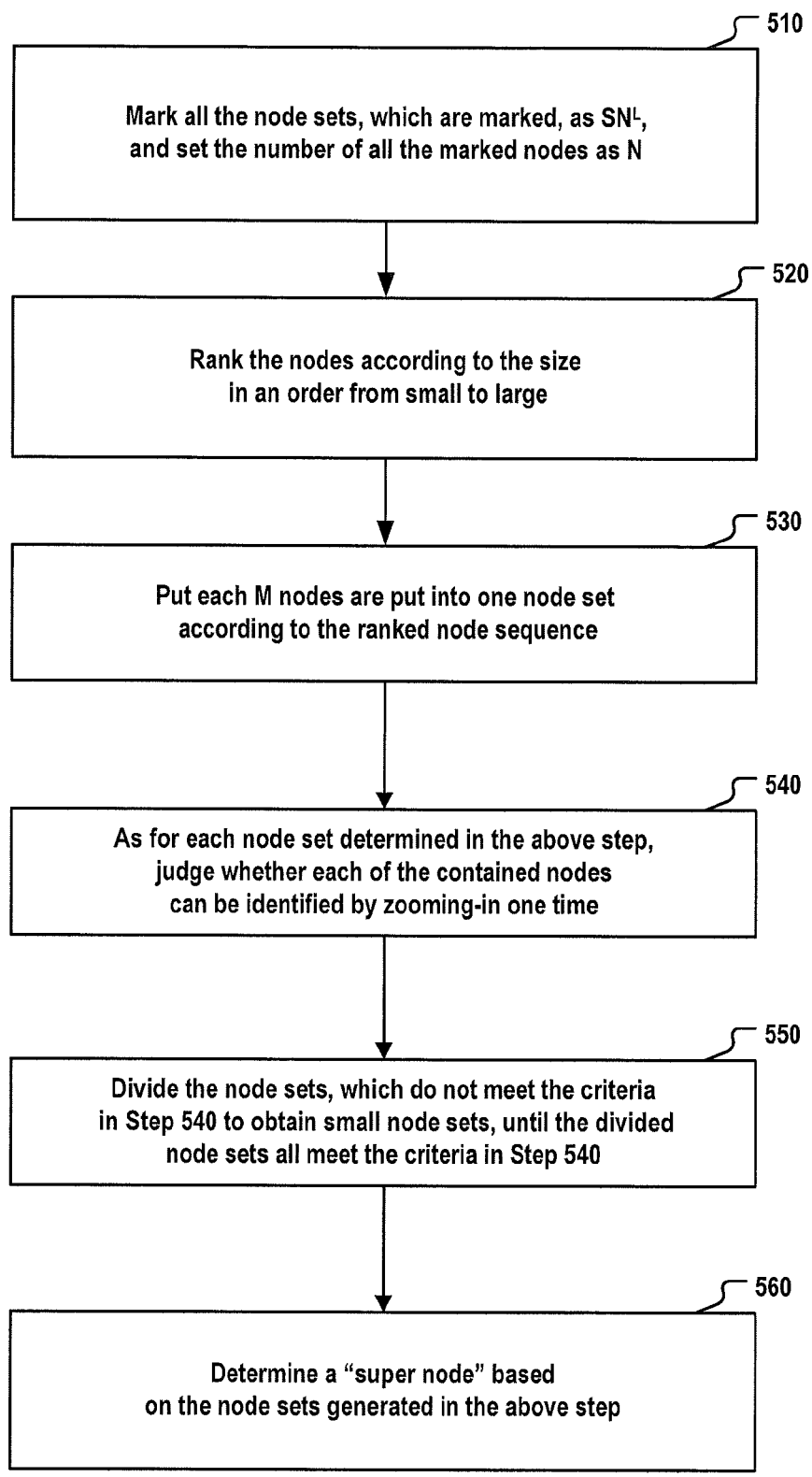
FIG. 5 shows a flow chart of the method for determining a super node according to another embodiment of the present invention.

FIG. 5 shows the operations for determining the super node in another specific embodiment, in which similarly, at least one super node set is determined based on the marked candidate node set, the screen size SS and the threshold size $S_T$ of the node capable of being identified on the screen. In particular, the method procedure shown in FIG. 5 may comprise:

In block 510, all the node sets, which are marked, are marked as $SN^L$, and the number of all the marked nodes is set as N.

In block 520, the nodes are ranked according to the size in an order from small to large.

In block 530, according to the ranked node sequence, each M nodes are put into one node set, such that the node sets in the number of [N/M] are obtained. If N cannot be divided exactly by M, the number of the nodes in the last node set is less than or equal to M. In this embodiment, the ranked candidate nodes are at equal interval divided into a plurality of candidate node subsets. As an alternative, it is also possible to divide the ranked candidate nodes at unequal interval divided into a plurality of candidate node subsets.

In block 540, as for each node set determined in the above operation, it is judged whether each of the contained nodes can be identified by zooming-in one time, that is, it is determined that whether the proportion of the size of the smallest node in the set to the total size of the set meets the Equation $$\frac{S_1}{\sum S_i} \geq \frac{S_T}{SS},$$

wherein $S_1$ represents the size of the smallest node in the set.

In block 550, the node sets, which do not meet the criteria in Block 540, are divided to obtain small node sets, until the divided node sets all meet the criteria in Block 540.

In block 560, a "super node" is determined based on the node sets generated in the above operation. In one embodiment, it is also possible to use the criteria of Block 540 to judge whether the super node can be displayed in one screen, wherein if yes, the super node sets are output, while if not, it is further possible to determine the nested super nodes.

Figure 6:
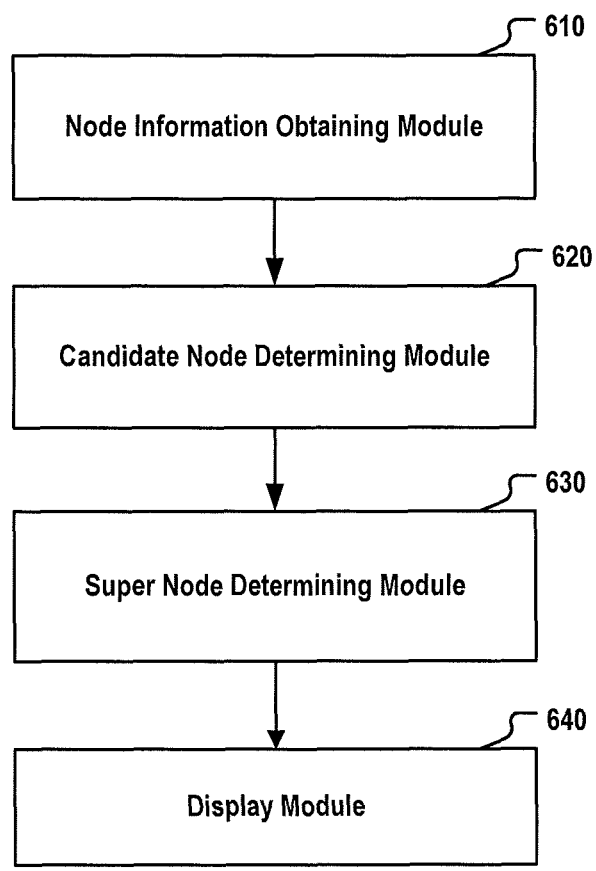
FIG. 6 illustrates a schematic view of the apparatus for generating a tree map according to one embodiment of the present invention.

FIG. 6 shows a device schematic view of a tree map generating system according to one embodiment of the present invention. The device comprises: a node information obtaining module 610, configured to obtain node information of a plurality of nodes to be processed, the plurality of nodes to be processed being sub nodes sharing a same parent node, and the node information comprising at least the sizes of the nodes; a candidate node determining module 620, configured to determine from the plurality of nodes a plurality of candidate nodes whose sizes are less than a threshold size; a super node determining module 630, configured to determine at least one super node comprising the plurality of candidate nodes based on the node information of the determined plurality of candidate nodes, the screen size and the threshold size, such that when displaying in a zooming-in mode the super node on the screen, all the candidate nodes in the super node can are displayed at display sizes not less than the threshold size; and a display module 640, configured to determine data required for displaying the tree map based on the determined super node.

In an improved embodiment, the system in FIG. 6 also comprises a zooming-in display module 650, which is configured to determine the data required to display in the zooming-in mode the selected super node on the screen, in response to receipt of a zooming-in operation on the selected super node.

In another embodiment, the candidate node determining module 620 comprises: a module configured to determine the size ratio Rk of each node, the size ratio Rk being a proportion of the node to a total size of the plurality of nodes to be processed; a module configured to determine the screen display size SSk of each node based on a product of the screen size SS and Rk; and a module configured to determine as the candidate nodes the nodes whose screen display sizes SSks are less than the threshold size.

In a specific embodiment, the super node determining module 630 further comprises: a module configured to rank the candidate nodes based on the node sizes; a module configured to determine accumulation distribution of the node sizes of the candidate nodes; a module configured to determine an original node of the super node; a module configured to determine an ending node of the super node based on the accumulation distribution, the threshold size, the screen size and the size of the original node; and a module configured to determine the super node based on the original node and the ending node.

In a specific embodiment, the ending node is determined based on the Equation $di \leq ds \cdot SS/S_T$, wherein di represents size distribution of the ending node i; ds represents size distribution of the original node s; SS represents the screen size; and $S_T$ represents the threshold size.

In another embodiment, the super node determining module 630 further comprises: a module configured to rank the candidate nodes based on the node sizes; a module configured to divide the ranked candidate nodes into a plurality of candidate node subsets; a module configured to judge whether all nodes of each candidate node subset can be identified by zooming-in one time, and divide the unqualified candidate node subsets until all nodes of all node sets can be identified by zooming-in one time; a module configured to determine the super node based on the divided candidate node subsets.

With the technical solution of the present application, when presenting data of each layer of the tree map based on the determined super node, more node information can be seen to learn the whole status of the tree map, and at the same time, during interaction procedure, it can be guaranteed as much as possible that each node can be clearly seen while reducing the number of the interactions as much as possible, which is a very suitable for tree map. In such a way of displaying and interacting with the purpose of displaying the overall status, the nodes with the very small size in the tree map data can be checked using a more convenient zooming-in mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a tree map, the method comprising:
obtaining, with a processing device, node information of a plurality of nodes to be processed, the plurality of nodes to be processed being sub-nodes sharing a same parent node and the node information comprising at least sizes of the nodes;

determining from the plurality of nodes a plurality of candidate nodes whose sizes are less than a threshold size;

determining super node including the plurality of candidate nodes based on the node information of the determined plurality of candidate nodes, a screen size, and the threshold size, such that when displaying in a zooming-in mode the super node on the screen, all candidate nodes in the super node are displayed at display sizes not less than the threshold size, wherein determining the super node comprises:

ranking the candidate nodes according to the node sizes;

dividing the ranked candidate nodes into a plurality of candidate node subjects;

judging whether all nodes of each candidate node subset can be identified by zooming-in one time, and dividing unqualified candidate node subsets until all nodes of all node sets can be identified by zooming-in one time; and determining the super node according to the divided candidate node subsets; and determining data required for displaying the tree map based on the super node.

2. The method according to claim 1, further comprising determining data required for displaying in the zooming-in mode a selected super node on the screen in response to receipt of a zooming-in operation on the selected super node.

3. The method according to claim 1, wherein determining the candidate nodes comprises:

determining a size ratio Rk of each node, the size ratio Rk being a proportion of the node to a total size of the plurality of nodes to be processed;

determining a screen display size SSk of the each node according to a product of the screen size SS and Rk; and determining as the candidate nodes the nodes whose screen display sizes SSks are less than the threshold size.

4. The method according to claim 1, wherein determining the super node further comprises:

ranking the candidate nodes according to the node sizes;

determining accumulation distribution of the node sizes of the candidate nodes;

determining an original node in the super node;

determining an ending node in the super node according to the accumulation distribution, the threshold size, the screen size and the size of the original node; and determining the super node according to the original node and the ending node.

5. The method according to claim 4, wherein the ending node is determined based on an Equation $di \leq ds \cdot SS/S_T$, wherein di represents size distribution of the ending node i; ds represents size distribution of the original node s; SS represents the screen size; $S_T$ represents the threshold size.

* * * * *